United States Patent
Yamoto et al.

(10) Patent No.: US 10,468,155 B2
(45) Date of Patent: Nov. 5, 2019

(54) INSULATED WIRE, COIL, AND ELECTRICAL OR ELECTRONIC EQUIPMENT

(71) Applicants: FURUKAWA ELECTRIC CO., LTD., Tokyo (JP); FURUKAWA MAGNET WIRE CO., LTD., Tokyo (JP)

(72) Inventors: Satoko Yamoto, Tokyo (JP); Hideo Fukuda, Tokyo (JP); Isao Tomomatsu, Tokyo (JP)

(73) Assignees: FURUKAWA ELECTRIC CO., LTD., Tokyo (JP); FURUKAWA MAGNET WIRE CO., LTD., Tokyo (JP)

( * ) Notice: Subject to any disclaimer, the term of this patent is extended or adjusted under 35 U.S.C. 154(b) by 0 days.

(21) Appl. No.: 16/299,924

(22) Filed: Mar. 12, 2019

(65) Prior Publication Data
US 2019/0206590 A1    Jul. 4, 2019

Related U.S. Application Data

(63) Continuation of application No. PCT/JP2017/032936, filed on Sep. 12, 2017.

(30) Foreign Application Priority Data

Sep. 13, 2016    (JP) .................................. 2016-179039

(51) Int. Cl.
*H01B 7/02* (2006.01)
*H01B 7/00* (2006.01)
(Continued)

(52) U.S. Cl.
CPC ......... *H01B 7/0225* (2013.01); *H01B 7/0009* (2013.01); *H01B 7/0275* (2013.01);
(Continued)

(58) Field of Classification Search
CPC .. H01B 7/0025; H01B 7/0009; H01B 7/0275; H01B 13/08; H01B 13/14; H01F 5/06;
(Continued)

(56) References Cited

U.S. PATENT DOCUMENTS 10,020,092 B2    7/2018   Oya et al.
2012/0241191 A1*  9/2012  Funayama ............... C09D 7/62
                                                 174/119 C
(Continued)

FOREIGN PATENT DOCUMENTS

JP    2007-166731 A    6/2007
JP    2010-126684 A    6/2010
(Continued)

OTHER PUBLICATIONS

International Search Report for PCT/JP2017/032936 (PCT/ISA/210) dated Oct. 17, 2017.
(Continued)

*Primary Examiner* — Hoa C Nguyen
*Assistant Examiner* — Amol H Patel
(74) *Attorney, Agent, or Firm* — Birch, Stewart, Kolasch & Birch, LLP

(57) ABSTRACT

An insulated wire, having:
a single conductor or multiple conductors;
an insulating layer on the outer periphery of the single conductor or each of the multiple conductors; and
an adhesion layer on the outer periphery of the insulating layer,
wherein the thickness of the adhesion layer is 2 to 200 μm,
wherein a resin constituting the adhesion layer does not have a melting point,
wherein the resin constituting the adhesion layer has a tensile modulus of $0.6 \times 10^7$ to $10 \times 10^7$ Pa at 250° C., and
wherein a substance having 2 or more amino groups exists on the surface of the adhesion layer;
(Continued)

a coil containing the insulated wire; and
an electrical or electronic equipment using the coil.

15 Claims, 3 Drawing Sheets

(51) Int. Cl.
*H02K 3/34* (2006.01)
*H02K 3/12* (2006.01)
*H02K 1/16* (2006.01)
*H01B 13/08* (2006.01)
*H01B 13/14* (2006.01)
*H01F 6/06* (2006.01)
*H01F 5/06* (2006.01)
*H01B 3/38* (2006.01)
*H01B 3/30* (2006.01)
*H01B 3/42* (2006.01)
*H01B 3/36* (2006.01)

(52) U.S. Cl.
CPC .............. *H01B 13/08* (2013.01); *H01B 13/14* (2013.01); *H01F 5/06* (2013.01); *H01F 6/06* (2013.01); *H02K 1/16* (2013.01); *H02K 3/12* (2013.01); *H02K 3/34* (2013.01); *H01B 3/301* (2013.01); *H01B 3/306* (2013.01); *H01B 3/36* (2013.01); *H01B 3/38* (2013.01); *H01B 3/427* (2013.01)

(58) Field of Classification Search
CPC ... H01F 6/06; H02K 1/16; H02K 3/12; H02K 3/34
See application file for complete search history.

(56) References Cited

U.S. PATENT DOCUMENTS

2016/0307663 A1* 10/2016 Ikeda .................. H01B 13/065
2017/0084361 A1*  3/2017 Oya ......................... H01B 3/30
2017/0316849 A1* 11/2017 Okabe .................. H01F 41/122

FOREIGN PATENT DOCUMENTS

WO     WO 2015/098638 A1     7/2015
WO     WO 2015/186730 A1    12/2015

OTHER PUBLICATIONS

Written Opinion of the International Searching Authority for PCT/JP2017/032936 (PCT/ISA/237) dated Oct. 17, 2017.

* cited by examiner

INSULATED WIRE, COIL, AND ELECTRICAL OR ELECTRONIC EQUIPMENT

CROSS-REFERENCE TO RELATED APPLICATIONS

This application is a Continuation of PCT International Application No. PCT/JP2017/032936 filed on Sep. 12, 2017, which claims priority under 35 U.S.C. § 119 (a) to Japanese Patent Application No. 2016-179039 filed in Japan on Sep. 13, 2016. Each of the above applications is hereby expressly incorporated by reference, in its entirety, into the present application.

TECHNICAL FIELD

The present invention relates to an insulated wire, a coil, and an electrical or electronic equipment.

BACKGROUND ART

In coils for the electrical or electronic equipment, including inverter-related equipment, such as high-speed switching devices, inverter motors, transformers, and the like, insulated electric wires are used as a magnet wire. Examples of the insulated electric wires include an insulated electric wire (insulated wire) composed of a so-called enamel wire, an insulated wire having multi-covering layers including a layer composed of an enamel resin and a covering layer composed of another kind of resin other than the enamel resin, and the like.

In regard to coils for the electrical or electronic equipment, various techniques have been developed in order to immobilize the insulated wire (winding wire) or to enhance the insulation property. For example, Patent Literature 1 discloses a structure in which a rectangular conductor whose outer periphery is coated with an insulating coating is stacked on top of each other to form a laminate and a sheet-like base material provided thereon with a thermosetting resin adhesive layer formed using an epoxy resin composition is coated on the outer periphery of said laminate. Patent Literature 2 discloses a technique of disposing an insulating paper at coil housing grooves formed at a stator core of a rotating electrical machine, immobilizing the coil at the coil housing groove using a varnish, and thereby immobilizing the coil while providing insulation between the coil and the stator core.

CITATION LIST

Patent Literatures

Patent Literature 1: JP-A-2010-126684 ("JP-A" means unexamined published Japanese patent application)
Patent Literature 2: JP-A-2007-166731

SUMMARY OF INVENTION

Technical Problem

In the technique described in Patent Literature 1, a thermosetting adhesive layer formed on a sheet base material is formed from an epoxy-based resin composition. Therefore when the sheet is used in a high-temperature environment (for example, 200° C. or higher), the thermosetting adhesive layer is softened, and thereby the thermosetting adhesive layer loses adhesiveness. In the technique described in Patent Literature 2, a varnish using a solvent was necessary in order to put the varnish in coil housing grooves formed at a stator thereby fixing the insulated wire to the core.

The present invention relates to an insulated wire which allows fixation to other parts without using any varnish only with said insulated wire which has an excellent fixing strength in a hot environment, a high partial discharge inception voltage, and an excellent bending workability, and further relates to a coil using the insulated wire, and electrical or electronic equipment using the coil.

Solution to Problem

The present inventors found that in the insulated wire which has a specific adhesion layer on the outer periphery of an insulating layer covering a conductor, said adhesion layer allows fixation to other parts with a strong fixing strength even under high temperature (for example, 200° C.). Further, the present inventors found that this insulated wire has a high PDIV of the bending section and also an excellent heat resistance. The present invention is based on these findings, and the inventors of the present invention further conducted investigation, thus completing the present invention.

That is, the problems of the present invention were solved by the following means:

(1) An insulated wire, having:
   a single conductor or multiple conductors;
   an insulating layer on the outer periphery of the single conductor or each of the multiple conductors; and
   an adhesion layer on the outer periphery of the insulating layer, wherein the thickness of the adhesion layer is 2 to 200 μm,
wherein a resin constituting the adhesion layer does not have a melting point,
wherein the resin constituting the adhesion layer has a tensile modulus of $0.6 \times 10^7$ to $10 \times 10^7$ Pa at 250° C., and
wherein a substance having 2 or more amino groups exists on the surface of the adhesion layer.

(2) The insulated wire described in the item (1), which has a film layer on the outer periphery of the adhesion layer,
wherein a resin constituting the film layer does not have a melting point, and
wherein the resin constituting the film layer has a tensile modulus of $0.6 \times 10^7$ to $10 \times 10^7$ Pa at 250° C.

(3) The insulated wire described in the item (2), wherein the film layer contains at least one kind of resins selected from the group consisting of polyetherimide, polycarbonate and polysulfone.

(4) The insulated wire described in any one of the items (1) to (3), wherein the adhesion layer contains at least one kind of resins selected from the group consisting of polyetherimide, polycarbonate, polysulfone, polyphenylsulfone and polyethersulfone.

(5) The insulated wire described in any one of the items (1) to (4), wherein the adhesion layer is porous.

(6) A coil, containing the insulated wire described in any one of the items (1) to (5).

(7) A superconducting coil, containing the insulated wire described in any one of the items (1) to (5).

(8) An electrical or electronic equipment, having the coil described in the item (6).

In the description of the present invention, any numerical expressions in a style of " . . . to . . . " will be used to indicate a range including the lower and upper limits represented by the numerals given before and after "to", respectively.

Effects of Invention

In the insulated wire of the present invention, its adhesion layer allows fixation to other parts with a strong adhesion force. Further, the insulated wire has a high partial discharge inception voltage (PDIV) of the bending section and an excellent heat resistance. Furthermore, a coil using the insulated wire of the present invention and an electrical or electronic equipment using the coil have excellent insulation property.

Other and further features and advantages of the invention will appear more fully from the following description, appropriately referring to the accompanying drawings.

MODE FOR CARRYING OUT THE INVENTION

[Insulated Wire]

Figure 1:
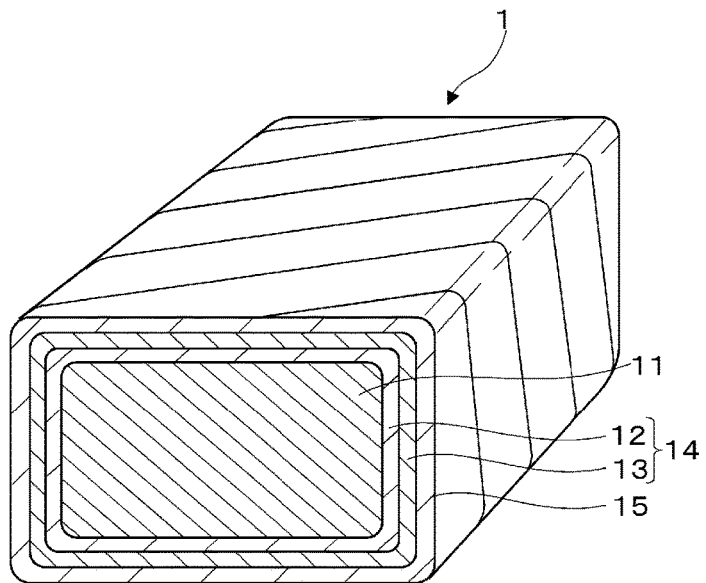
FIG. 1 is a schematic perspective cross-sectional view showing an example of a preferable embodiment of the insulated wire of the present invention.

The insulated wire of the present invention has an insulating layer on the outer periphery of a conductor having a rectangular cross-section, and an adhesion layer on the outer periphery of this insulating layer. Further, it is preferable that the insulated wire has a film layer on the outer periphery of this adhesion layer. The compositions of the conductor and the various layers that constitute the insulated wire will be described below.

Hereinafter, preferable embodiments of the insulated wire of the present invention are described with reference to the drawings.

The present invention is not limited to the following embodiments, except for the matters stipulated in the present invention. Further, the form shown in each drawing is a schematic view for making comprehension of the present invention easy. Therefore, the size, the thickness, or the relative magnitude relationship, and the like, of each member may be appropriately subjected to variation for the purpose of illustration. Accordingly, the drawing does not show a real relationship as it is. Further, those other than the matters stipulated in the present invention are not limited to the external form and the shape, as shown in these drawings.

A preferable insulated wire 1 of the present invention shown in FIG. 1, has a conductor 11, a resin covering layer 14 formed on the outer periphery of the conductor 11, and a film layer 15.

As to the conductor 11, its cross-sectional shape is rectangular (flat angular shape). In the present invention, the conductor having a rectangular cross-section includes a conductor having an oblong cross-section and a conductor having a square cross-section. Further, the conductor having a rectangular cross-section includes a conductor whose corner section has round corners.

The resin covering layer 14 has double-layered structure composed of: an insulating layer 12 as an innermost resin layer in contact with the outer periphery of the conductor 11; and an adhesion layer 13 in contact with the outer periphery of the insulating layer 12. A total thickness of the resin covering layer 14 is preferably set to a range of 65 to 330 μm.

In the present specification, the thickness of the resin covering layer or each of the layers which constitute the resin covering layer, is determined by observing the cross-section of the insulated wire cut at right angle with respect to the longitudinal direction thereof by using a microscope. Then at the arbitrarily selecting 16 points, the shortest distance of from the outer periphery of the inner layer in contact with the resin layer of the measuring object (a conductor in the case where the layer of the measuring object is in contact with the conductor) to the outer periphery of the layer of the measuring object is measured, and the thickness is a value calculated as an average value thereof.

Figure 2:
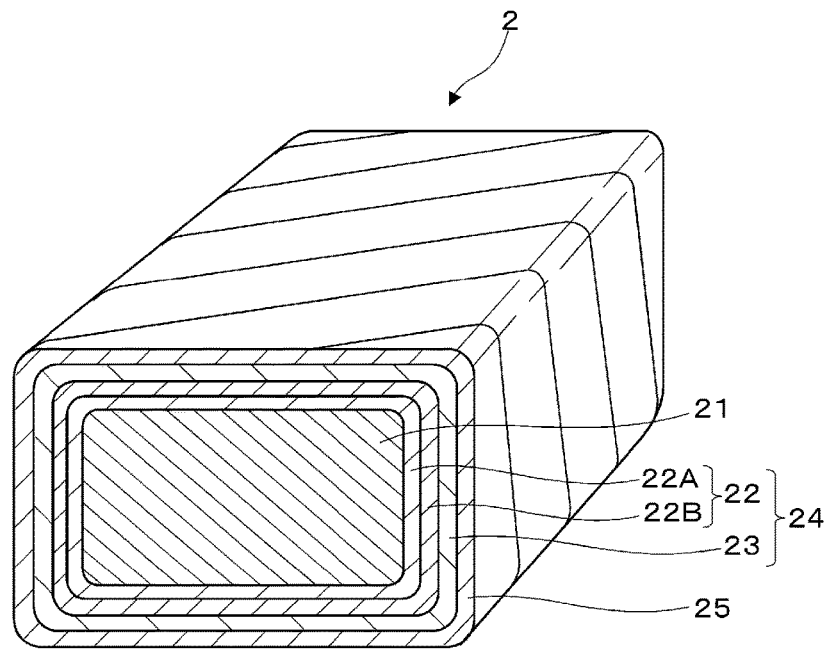
FIG. 2 is a schematic perspective cross-sectional view showing an example of another preferable embodiment of the insulated wire of the present invention.

The preferable insulated wire 2 of the present invention whose cross-sectional view is shown in FIG. 2 has the same constitution as the insulated wire 1, except that the insulating layer 22 has a two-layer structure composed of an insulating layer 22A and an insulating layer 22B.

In the following description, the conductor, insulating layer, adhesion layer and film layer constituting the insulated wire of the present invention will be explained with reference to FIG. 1 and FIG. 2.

<Conductors 11, 21>

As the conductor 11 or 12 to be used in the present invention, use may be broadly made of any usual one that is used in insulated wires, and examples thereof include a metal conductor such as a copper wire and an aluminum wire. Further, a divided conductor composed of a number of subdivided conductors may be used. The conductor is preferably a low-oxygen copper whose oxygen content is 30 ppm or less, and furthermore preferably a low-oxygen copper whose oxygen content is 20 ppm or less or oxygen-free copper In the case where the conductor is melted by heat for the purpose of welding when the oxygen content is 30 ppm or less, voids which may be caused by contained oxygen are not occurred at a welded portion, the deterioration of the electrical resistance of the welded portion can be prevented, and the mechanical strength of the welded portion can be also secured.

As to the conductor 11 or 12 to be used in the present invention, its cross-sectional shape is rectangular (flat angular shape). The rectangular conductor is able to increase a space factor with respect to the slot of the stator core at the winding, with comparison to a circular conductor.

In view of suppressing partial discharge from a corner portion, the rectangular conductor has preferably such a shape that chamfered edges (curvature radius r) are provided at four corners of cross-section in width direction of the conductor, as shown in FIG. 1 or FIG. 2. The curvature radius r is preferably 0.6 mm or less, and more preferably in a range from 0.2 to 0.4 mm.

The size of the conductor is not particularly limited. In the case of the rectangular conductor, in the rectangular cross-sectional shape, the width (long side) thereof is preferably from 1.0 to 5.0 mm, and more preferably from 1.4 to 4.0 mm, and the thickness (short side) is preferably from 0.4 to 3.0 mm, and more preferably from 0.5 to 2.5 mm. The ratio of length (thickness:width) of the width (long side) and the thickness (short side) is preferably from 1:1 to 1:4. To the contrary, in the case of a conductor whose cross-sectional shape is round, the size is preferably 0.3 to 3.0 mm, and more preferably 0.4 to 2.7 mm in terms of a diameter. Note that, when the ratio (thickness:width) of the length of the width (longer side) and the length of the thickness (shorter side) is 1:1, the longer side means one of a pair of sides facing each other, while the shorter side means one of another pair of sides facing each other.

<Insulating Layers 12, 22>

In regard to the insulated wire of the present invention, it is preferable that the insulating layers 12 and 22 are a layer formed from a thermosetting resin (after bake-coating).

According to the present invention, in the case where the phrase "layer formed from resin (resin Z)" is used, the phrase will be used to mean to include both an embodiment of a layer formed from resin Z only, and an embodiment of a layer formed from resin Z and another component (for example, a resin other than the resin Z or an additive). Here, the percentage content of the "other component" in the layer formed from resin Z is not particularly limited as long as the intended effects are not impaired, and the percentage content is ordinarily larger than 0% by mass and 10% by mass or less (preferably, 5% by mass or less).

The thermosetting resin layer according to the present invention means a resin layer in a cured state, but does not mean a resin layer before being cured.

In regard to the insulated wire of the present invention, it is preferable that the insulating layers 12 and 22A each are a resin layer cured by the treatment of ordinarily bake-coating a varnish of a thermosetting resin or the like.

The thermosetting resin to be used in the insulating layer 12 or 22A is not particularly limited, and examples thereof include thermosetting polyimide (PI), polyamideimide (PAI), polyesterimide, polyester (PEst), and polyurethane. Among these, at least one kind selected from the group consisting of polyimide and polyamideimide is preferred.

For example, use may be made of a PI varnish in which PI has been dissolved in dimethyl acetamide or the like so that the resin content is from 15 to 30% by mass. Further, use may be made of a PAI varnish in which PAI has been dissolved in N-methyl-2-pyrolidone so that the resin content is from 15 to 30% by mass.

In the insulating layer 12 or 22A, one kind of the thermosetting resin may be used alone, or alternatively two or more kinds thereof may be used in combination.

The polyimide capable of constituting the insulating layer 12 or 22A is not particularly limited, and use can be made of ordinarily polyimide, such as a whole aromatic polyimide and a thermosetting aromatic polyimide. Alternatively, use may be made of polyimides obtained, in a usual manner, by a method in which an aromatic tetracarboxylic dianhydride and an aromatic diamine compound are reacted in a polar solvent, to obtain a polyamide acid solution, and then the thus-obtained polyamide acid solution is subjected to imidization by a thermal treatment at the time of baking.

The polyamideimide capable of constituting the insulating layer 12 or 22A is not particularly limited, and the examples thereof include polyamideimide obtained, in a usual manner, for example, by a method in which a tricarboxylic anhydride and a diisocyanate compound are directly reacted in a polar solvent. Alternatively, the examples thereof include polyamideimides obtained by a method in which a diamine compound is reacted with a tricarboxylic anhydride in a polar solvent to previously introduce an imide bond to the reaction product, and then the reaction product is subjected to amidation using a diisocyanate compound.

The polyesterimide capable of constituting the insulating layer 12 or 22 is not particularly limited, as long as it is a polymer having an ester bond and an imide bond in the molecule and a thermosetting property. For example, use may be made of: one, obtained by forming the imide bond from a tricarboxylic anhydride and an amine compound, forming the ester bond from alcohol and a carboxylic acid or an alkyl ester thereof, and then joining of a free acid group or an anhydride group of the imide bond in an ester-forming reaction. As such a polyesterimide, use may be also made of: one, obtained by allowing, for example, a tricarboxylic anhydride, a dicarboxylic acid compound or an alkyl ester thereof to react with an alcohol compound and a diamine compound in a usual manner.

Further, the polyester which may constitute the insulating layer 12 or 22 is not particularly limited, as long as it is a polymer having an ester bond in the molecule and a thermosetting property. The polyester is preferably a Class H polyester (HPE). Examples of the Class H polyester include an aromatic polyester modified by adding a phenol resin or the like thereto, and also having Class H heat resistance.

The thickness of the insulating layer 12 or 22A is not particularly limited, and it is ordinarily 30 to 200 μm, more preferably 40 to 180 μm. Further, also the thickness of the insulating layer 22B is not particularly limited, and it is ordinarily 40 to 200 μm, more preferably 60 to 160 μm.

As a thermosetting resin to be used in the insulating layer 12 or 22A, any of commercial products may be used. Examples of the polyimide include U IMIDE AR (trade name, manufactured by Unitika Ltd.), U-VARNISH (trade name, manufactured by Ube Industries, Ltd.), and the like. Examples of the polyamideimide include HI406 (trade name, manufactured by Hitachi Chemical Co., Ltd.) and the like. The insulating layers 12 and 22A may be in the form in which air bubbles exist within the layer.

<Adhesion Layers 13, 23>

The adhesion layers 13 and 23 are able to adhere to, for example, a core and as a result, are able to fix an insulated wire to the core. Examples of the core include a core of the coil, specifically a stator core, a rotor core and the like of the rotating machine. These adhesion layers 13 or 23, and the core are subjected to a heat treatment at 170° C. or more and 210° C. or less in contact with each other through the film layer 15. The heat treatment temperature for adhesion is preferably from 170 to 210° C., and more preferably from 180 to 200° C. The heat treatment time for adhesion is preferably from 10 to 40 min, and more preferably from 10 to 30 min. If the heat temperature is too high, the thermoplastic resin melts out, and if the heat temperature is too low, the adhesion force becomes not to be developed.

The adhesion layers 13 and 23 each are formed from a thermoplastic resin having particular physical properties. That is, the thermoplastic resin that constitutes the adhesion layers 13 and 23 does not have a melting point. Since the thermoplastic resin that constitutes the adhesion layers does not have a melting point, even if the adhesion layers are repeatedly exposed to high temperature or exposed to high temperature for a long time period, the adhesion layers do not easily become hard, and the state of being strongly fixed to an object can be persistently maintained stable for a long time period. The phrase "does not have a melting point" according to the present invention means that a crystal melting peak or a crystallization peak is not observed in a differential scanning calorimetric (DSC) analysis.

Further, the thermoplastic resin that constitutes the adhesion layers 13 and 23 has a tensile modulus at 250° C. of $0.6 \times 10^7$ to $10 \times 10^7$ Pa, preferably $0.6 \times 10^7$ to $4.0 \times 10^7$ Pa, and more preferably $0.8 \times 10^7$ to $3.5 \times 10^7$ Pa. By having such a tensile modulus, the thermoplastic resin can exhibit strong fixing strength even in a severe environment at higher temperature. The "tensile modulus at 250° C." can be measured by the method described in the section for Examples given below.

Further, the thermoplastic resin that constitutes the adhesion layers 13 and 23 has a substance having 2 or more amino groups on the surface of the adhesion layer. Specifically, after cooling the thermoplastic resin that constitutes the adhesion layers 13 and 23, the substance having amino groups is dispersed on the surface of the adhesion layer by, for example, a spray. Specific examples of the substance having 2 or more amino groups include 4,4'-diaminodiphenyl ether, 1,4-butanediamine, 1,6-hexanediamine and 1,10-decanediamine. The substance having amino groups is contained in an amount of 3 to 15% by mass, preferably 3 to 12% by mass, and more preferably 4 to 10% by mass, with respect to the adhesion layer 13. If the substance having amino groups is too much, the persistence of the adhesion becomes weak and if the substance having amino groups is too little, a reaction for adhesion becomes weak.

The thermoplastic resin that constitutes the adhesion layers 13 and 23 is not particularly limited as long as the thermoplastic resin has the physical properties described above, and for example, use can be made of at least one resin selected from the group consisting of polyetherimide (PEI), polycarbonate (PC), polysulfone (PSU), polyphenylsulfone (PPSU) and polyethersulfone (PES), and preferably at least one resin selected from the group consisting of polyetherimide (PEI), polycarbonate (PC) and polysulfone (PSU). It is also preferable to use a resin blend of any two or more of these resins.

When a diamine compound as a substance having 2 or more amino groups is dispersed on the thermoplastic resin that can constitute the adhesion layers 13 and 23, a thermoplastic resin (for example, polyetherimide) causes a crosslinking reaction through an amino groups of the diamine compound by heat performed during adhesion. Adhesion force of the adhesion layers 13 and 23 is increased by this crosslinking reaction.

Further, polycarbonate, polysulfone or the like that can constitute the adhesion layers 13 and 23 also causes a crosslinking reaction, whereby adhesion force of the adhesion layers 13 and 23 is increased.

This allows performance of adhesion with a strong adhesion force.

The content of any of polyetherimide, polycarbonate and polysulfone among the thermoplastic resins that constitute the adhesion layers 13 and 23 is preferably 50% by mass or more, more preferably 70% by mass or more, even more preferably 80% by mass or more, and particularly preferably 90% by mass or more, as a total content.

The thickness of the adhesion layers 13 and 23 is not particularly limited, and from the viewpoint of achieving both sufficient fixing strength and high density (space factor) of the coil, the thickness is generally 2 to 200 μm, and preferably 5 to 200 μm. If the thickness of the adhesion layer is too thick, sometimes cracks may occur at the bending processing and if the thickness of the adhesion layer is too thin, adhesion property becomes to decrease.

As a thermoplastic resin that constitutes the adhesion layers 13 and 23, a porous one may be used. The production method thereof is not particularly limited, as long as the method makes the resin porous. Examples thereof include a method in which a process of heating or the like is included. An effect of improving adhesion property is obtained by its porous property.

<Film Layers 15, 25>

The film layers 15 and 25 are required to accomplish a role equivalent to that of the insulating paper to be used in a process for forming a coil by winding a winding wire produced from a round wire or a rectangular wire around, for example, a stator coil that constitutes a motor for driving a hybrid vehicle. Therefore, it is required that the film layer have excellent insulating property and excellent heat resistance. For example, at least one kind of resins selected from the group consisting of polyetherimide (PEI), polycarbonate (PC) and polysulfone (PSU) can be used to the film layers 15 and 25. Further, it is also preferable to use a resin blend of any two or more of these resins. The film layers 15 and 25 are, for example, formed as layers, by winding a film layer having a predetermined width on the outer periphery several times when an insulated wire having an insulating layer and an adhesion layer formed on a conductor is used for wiring. The thickness of the layer of the film layer 15 is generally 10 to 200 μm, and preferably about 50 to 180 μm. If the thickness of the film layer is too thick, this is disadvantageous in the viewpoint of space factor (a percentage occupied by a conductor) and if the thickness of the film layer is too thin, the film layer fractures at the bending processing.

The film layer 15 or 25 are heated together with the adhesion layer 13 or 23 at the time of a heat treatment for adhesion to react with a substance having 2 or more amino groups, which has been dispersed on the surface of the adhesion layer 13 or 23, thereby developing an adhesion force. This reaction is the same as the reaction between the adhesion layer 13 or 23, and the substance having amino groups.

<Insulating Layer 22B>

In the present invention, the insulated wire 1 having the constitution shown in FIG. 1 may have a constitution shown in FIG. 2, in which an insulating layer composed of a thermoplastic resin is arranged between the insulating layer 12 and the adhesion layer 13. In other words, the insulating layer is composed of two layers consisting of the insulating layer 22A and the insulating layer 22B.

The thermoplastic resin that constitutes the insulating layer 22B is not particularly limited. For example, extrusion-moldable thermoplastic resin is used as the thermoplastic resin constituting the insulating layer 22B. In this point, the thermoplastic resin has a melting point of 250° C. or more, preferably 270° C. or more, and further preferably 300° C. or more. The melting point can be measured by a differential scanning calorimetric (DSC) analysis.

The insulating layer 22B has relative permittivity of 4.5 or less, preferably 4.0 or less, and further preferably 3.8 or less, in that a partial discharge inception voltage can be more increased. The relative permittivity can be measured by a commercially available permittivity measurement device. The measuring temperature and frequency are changed as needed. In the present specification, the values measured at 25° C. and 50 Hz are adopted, unless otherwise specified.

Examples of the extrusion-moldable thermoplastic resin having relative permittivity of 4.5 or less include polyetheretherketone, a modified polyetheretherketone, a thermoplastic polyimide, and the like.

For the insulating layer 22B, use may be, particularly preferably, made of any of thermoplastic resins having a melting point of 270° C. or more and 450° C. or less and having relative permittivity of 4.5 or less. Examples thereof include a polyetheretherketone (PEEK: melting point 343° C., relative permittivity 3.2), a thermoplastic polyimide (TPI: melting point 388° C., relative permittivity 3.2), and a modified polyetheretherketone (modified PEEK: melting point 345° C., relative permittivity 3.2). Examples thereof also include a polyaryletherketone (PAEK: melting point 343° C., relative permittivity 3.2), and polyphenylene sulfide (PPS: melting point 280° C., relative permittivity 3.5). At least one kind of resins selected from the group consisting of a PEEK, PPS, and modified PEEK.

As the thermoplastic resin to be used for the insulating layer 22B, one kind may be used alone, or more than two kinds may be used. In the case where two kinds are mixed and two kinds of melting points exist, a resin having a melting point of 270° C. or more may be suitably included.

[Method of Producing Insulated Wire]

The insulated wire of the present invention is formed by coating an insulating layer and an adhesion layer on the periphery of a conductor. Further, the insulated wire is formed by coating a film layer on the periphery of said adhesion layer.

The extrusion temperature conditions in extrusion molding of the insulating layer and adhesion layer are set adequately depending on the thermoplastic resin to be used. Stated as an example of a preferable extrusion temperature, specifically, in order to make the melt viscosity appropriate for extrusion-coating, the extrusion temperature is set to a temperature higher than the melting point of the thermoplastic resin by about 40° C. to 60° C. In this way, the insulating layer and adhesion layer of the thermoplastic resin are formed by temperature-setting extrusion molding. In this case, in the production process, it is not necessary to pass through a baking furnace in forming the insulating layer and adhesion layer, so that there is an advantage that the thickness of the insulating layer and adhesion layer can be thickened.

A method of forming the film layers 15 and 25 is not particularly limited. For example, after formation of the insulating layer 12 or 22, and the adhesion layer 13, the film layer can be formed by spirally winding a film around in the form of multiple layers, while travelling a wire through, with the wire-travelling direction as the axis using film-winding equipment.

Accordingly, in the insulated wires 1 and 2, both the insulating layer 22B and the adhesion layers 13 and 23 can be formed by extrusion-molding and therefore preparation of the varnish for use is not required. Accordingly, formation can be performed without any solvent for the varnish and therefore the insulated wire can be produced environmentally friendly.

Figure 3:
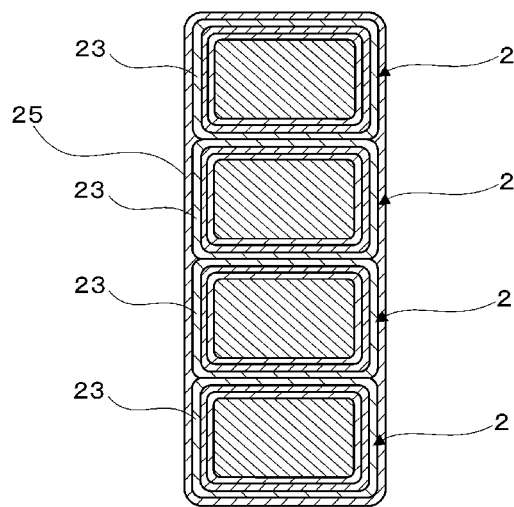
FIG. 3 is a schematic cross-sectional view showing an example of preferable another embodiment of the insulated wire of the present invention.

Further, as shown in FIG. 3, the insulated wire 2 may be stacked on top of each other to form multiple layers. In the constitution in which the insulated wire 2 is stacked on top of each other, the film layer 25 is formed on the outermost periphery of the stacked insulated wires. That is, the constitution may be such that the film layer 25 is formed on the outermost periphery (surface of the adhesion layer 23) with the state where each insulated wire 2 is stacked on top of each other and the film layer 25 is not formed between the insulated wires 2. Although not shown, the insulated wire 1 also can be stacked on top of each other to form multiple layers in the same constitution as the insulated wire 2.

[Coil, and Electrical or Electronic Equipment]

The insulated wire of the present invention is applicable to a field which requires electrical properties (resistance to voltage) and heat resistance, such as various kinds of electrical or electronic equipment, as coil. For example, the insulated wire of the present invention is used for a motor, a transformer and the like, which can compose high-performance electrical or electronic equipment. In particular, the insulated wire is preferably used as a winding wire for a driving motor of hybrid vehicle (HV) and electrical vehicle (EV). As descried above, according to the present invention, it is possible to provide a coil using the insulated wire of the present invention, and an electrical or electronic equipment using the coil, in particular a driving motor of HV and EV. Further, the insulated wire of the present invention can be used for a superconducting coil by using a superconductor as a conductor. The superconducting coil using this insulated wire can be preferably used, for example, as a superconducting magnet, and allows provision of a superconducting linear motor.

The coil of the present invention is not particularly limited, as long as it has a form suitable for any of various kinds of electrical or electronic equipment, and examples thereof include: items formed by a coil processing of the insulated wire of the present invention, and items formed by making an electrical connection of prescribed parts after subjecting the insulated wire of the present invention to a bending processing.

The coils formed by coil processing of the insulated wire of the present invention, are not particularly limited, and examples thereof include a roll formed by spirally winding around a long insulated wire. In these coils, the number of winding wires or the like of the insulated wire is not particularly limited. Ordinarily, in winding around the insulated wire, use may be made of an iron core, or the like.

Figure 4:
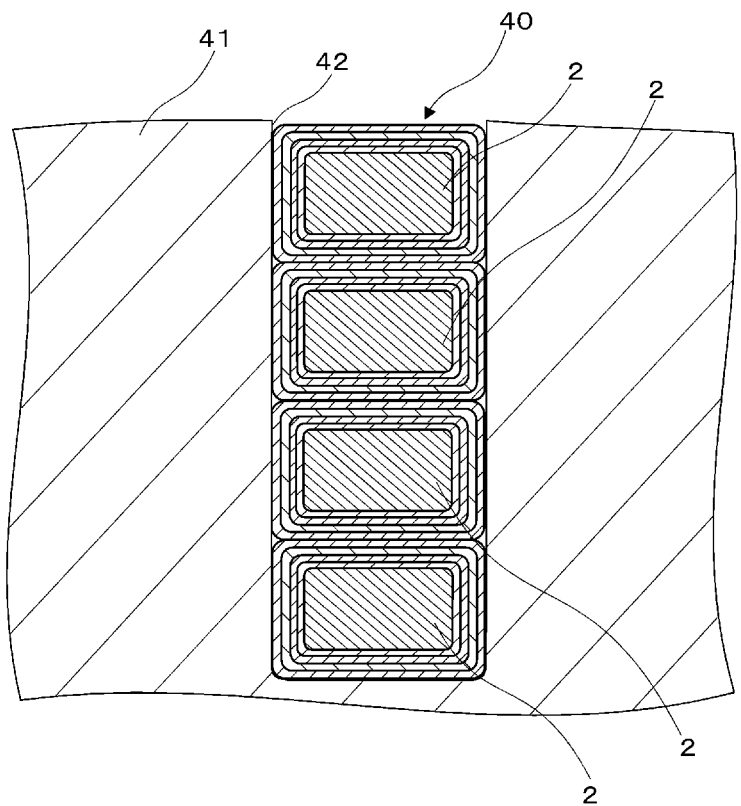
FIG. 4 is a schematic partial cross-sectional view showing an example of a preferable embodiment of the coil.

For example, as shown in FIG. 4, the insulated wire 1 or 2 (the insulated wire 2 was shown in the drawing) is wound multiple times in the groove 42 formed in the core 41, whereby the coil 40 is formed. The coil 40 is subjected to a heat treatment after wiring thereby to melt the insulating layer 23 and the film layer 25 of the insulated wire 2, so that the insulated wires 2 are heat-sealed and further the insulated wire 2 is heat-sealed to the core 41 which constitutes the inner wall of the groove 42. The heat treatment is performed at a temperature of 180 to 200° C. for 20 to 30 min, depending on the kind of the adhesion layer. In this way, the insulated wire 2 can be immobilized in the groove 42 without a varnish.

Figure 5:
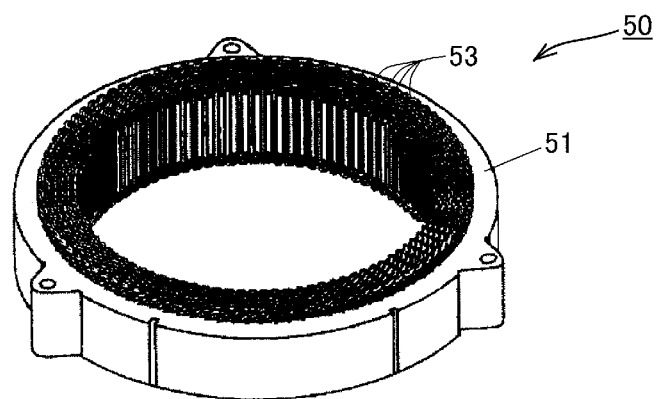
FIG. 5 is a schematic perspective view showing an example of a preferable embodiment of the stator to be used in the electrical or electronic equipment.
Figure 6:
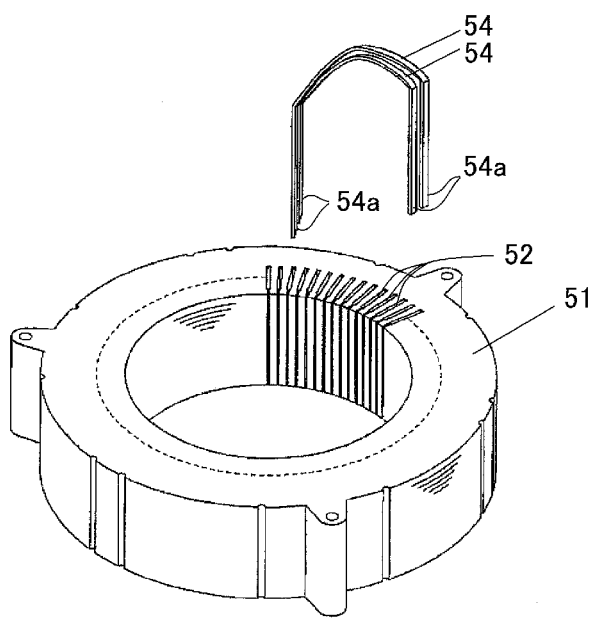
FIG. 6 is a schematic exploded perspective view showing an example of a preferable embodiment of the stator to be used in the electrical or electronic equipment.

Examples of the items formed by making an electrical connection of prescribed parts after subjecting the insulated wire to a bending processing include coils to be used in a stator for rotating electrical machines or the like. Examples of these coils include: a coil 53 (see FIG. 5) prepared, by cutting the insulated wire of the present invention having the constitution as shown in FIGS. 1 and 2 in a prescribed length, and then subjecting it to a bending processing in the U-shaped form or the like, thereby preparing a plurality of wire segments 54, and then alternately connecting two open ends (terminals) 54a in the U-shaped form or the like of each wire segment 54, as shown in FIG. 6. When the insulated wire of the present invention is used, the adhesion layer 13 and the slot 52 can be fixed through the film layer 15 by heating the coil 53 at a temperature of for example, 170° C. or more, whereby the coil is immobilized. For example, after wiring, a powder coating is performed. By heating at this powder coating, the insulated wire can be heat-sealed. In this way, because heat-seal can be done using a heating process in other steps, reduction of the number of processes can be achieved. Further, a varnish is not necessary to be used in order to immobilize the coil formed by the insulated wire of the present invention. Therefore, this allows omission of each of processes of coating of the varnish, temperature-rising and curing of the varnish after the powder coating. Accordingly, the number of the processes is further reduced, which results in reduction of production cost.

The electrical or electronic equipment formed by using the coil is not particularly limited. Examples of one preferable embodiment of such electrical or electronic equipment include a rotating electric machine equipped with a stator 50 as shown in FIG. 5 (in particular, driving motors of HV and EV). This rotating electric machine can be made in the same constitution as the conventional one, except that the rotating electric machine has the stator 50.

The stator 50 can be made in the same constitution as the conventional one, except that its wire segment 54 is formed by the insulated wire of the present invention. That is, the stator 50 has a stator core 51 and a coil 53 as shown in FIG. 5. In the coil 53, as shown in FIG. 6, a wire segment 54 composed of the insulated wire of the present invention having the constitution shown in FIG. 1 or FIG. 2 is incorporated in a slot 52 of a stator core 51, and open ends 54*a* are electrically connected. Herein, the wire segment 54 may be incorporated in the slot 52 with one segment. However, it is preferable that as shown in FIG. 6, two segments are incorporated in a pair. In this stator 50, the coil 53 formed by alternately connecting the open ends 54*a* that are two ends of the wire segments 54 which have been subjected to bending processing as described above, is incorporated in the slot 52 of the stator core 51. In this time, the wire segment 54 may be incorporated in the slot 52 after connecting the open ends 54*a* thereof. Alternatively, after incorporating the wire segments 54 in the slot 52, the open ends 54*a* of the wire segments 54 may be subjected to bending processing, thereby to connect them.

In the insulated wire of the present invention, the use of the conductor having a rectangular cross-sectional shape allows, for example, enhancement in a ratio (space factor) of the cross-sectional area of the conductor to the slot cross-sectional area of the stator core, whereby properties of the electrical or electronic equipment can be improved.

The present invention will be described in more detail based on examples given below, but the invention is not meant to be limited by these.

EXAMPLES

Examples, Comparative Examples

Example 1

The insulated wire of Example 1 having the constitution as shown in FIG. 2, was produced.
<Conductor 11>
As a conductor 11, use was made of a rectangular conductor having rectangular cross-section (long side 3.2 mm×short side 2.4 mm, curvature radius of chamfered edge at four corners r=0.3 mm) (copper having an oxygen content of 15 ppm).
<Insulating Layer 22A>
A polyamideimide (PAI) varnish was coated on a surface of the conductor, with using a die having a cross-sectional outer shape of the innermost thermosetting resin layer having contact with the conductor, and having a similarity shape of the cross-sectional shape shown in FIG. 1. The PAI varnish was prepared by dissolving PAI in N-methyl 2-pyroridone. Then, the conductor was passed through an 8 m-long baking furnace controlled at 450° C. at the speed of 15 seconds passing time. In this once baking step, a layer having a thickness of 5 μm was formed. This step was repeated 8 times, to thereby form the insulating layer 22A (Insulating layer (A) in Table 1) having the total thickness of 40 μm.
<Insulating Layer 22B>
As a screw of the extruder, use was made of the screw specified by: 30 mm full flight; L/D=25; and compression ratio 3. As the material, use was made of polyetheretherketone (PEEK) (manufactured by Victrex Japan Inc., trade name: 450G, relative permittivity: 3.2). The extrusion temperature conditions were set as follows.
(Extrusion Temperature Conditions)
  C1: 260° C.
  C2: 300° C.
  C3: 380° C.
  H: 380° C.
  D: 380° C.
After extrusion-covering of PEEK with using the extrusion die, water cooling was performed at two second intervals, thereby to form an 160 μm-thick insulating layer 22B (Insulating layer (B) in the Table 1 below) on the outer side of the conductor 11.
<Adhesion Layer 13>
As a screw of the extruder, use was made of the screw specified by: 30 mm full flight; L/D=25; and compression ratio 3. As the material, use was made of polyetherimide (PEI) (manufactured by SABIC, trade name: ULTEM 1000, relative permittivity: 3.2). The extrusion temperature conditions were set as follows.
(Extrusion Temperature Conditions)
  C1: 260° C.
  C2: 300° C.
  C3: 300° C.
  H: 360° C.
  D: 360° C.
After extrusion-covering of PEEK with using the extrusion die, water cooling was performed at two second intervals, thereby to form a 50 μm-thick adhesion layer 23 (Adhesion layer (C) in the Table 1 below) on the outer side of the insulating layer 22B.

Then, after cooling the thermoplastic resin that forms the adhesion layers 13 and 23, 4,4'-diaminodiphenyl ether as a substance having amino groups was dispersed on the surface of the adhesion layers 13 and 23 by using, for example, a spray so that the mass ratio of 4,4'-diaminodiphenyl ether with respect to the adhesion layers 13 and 23 was 8% by mass.
<Film Layer 15>
For the film layer 15, 100 μm-thick polycarbonate (PC) film (trade name: CALIBRE 300, manufactured by Sumika Styron Polycarbonate Limited) was used. The 150 μm-thick film layer 15 was formed on the surface of the adhesion layer 13 provided thereon with a dispersion of the substance having amino groups, by spirally winding the film around in the form of multi-film layers, while travelling a wire through, with the wire-travelling direction as the axis using film-winding equipment.

Examples 2 to 10, Comparative Examples 1 to 5

Examples 2 to 5, 10 (insulated wires shown in FIG. 2) and 6 to 9 (insulated wires shown in FIG. 1) shown in the following Table were obtained in the same manner as in the above-described Example 1, except for changing the kind of resins that form each layer and the thickness of each layer as shown in following Table 1. Further, insulated wires for Comparative Examples 1 to 5 were obtained.

Herein, the symbol "–" in the Table 1 below means that no layer was provided, or the like.

<Measurement and Evaluation>

(1) Tensile Modulus at 250° C. of Resin that Constitutes Adhesion Layer

For each of the thermoplastic resins to be used in the adhesion layers (A) and (B) described in the Table 1, a dumbbell-shaped specimen having a thickness of 1.6 mm (ASTM D 638) was prepared, and the tensile modulus was measured using a dynamic viscoelasticity analyzer (trade name: DMA 8000, manufactured by PerkinElmer Japan Co., Ltd.). The tensile modulus was measured in the tensile mode while the temperature was increased from 50° C. to 270° C. at a rate of temperature increase of 10° C./min at 1 Hz, and thus the tensile modulus at 250° C. was obtained.

(2) Fixing Strength in High Temperature Atmosphere (200° C.) (High-Temperature Fixing Strength)

Adhesion force was evaluated by the following fixing strength test using two insulated wires in which two electric wires having a layer constitution before forming a film layer (in each Example and each Comparative Example) were stacked on top of each other.

The superposed length thereof was set to 200 mm and the two insulated wires were fixed by a heat treatment at 200° C. for 30 min. This wire was placed in a constant-temperature chamber-attached tensile testing machine (manufactured by Shimadzu Corporation, trade name: AUTOGRAPH AGS-J, constant-chamber temperature: 200° C.), and the two ends of the superposed wires were pulled in opposite directions from each other at a tensile rate of 50 mm/min. The strength required for breaking the fixed state of the two wires was designated as the fixing strength, and the fixing strength was evaluated according to the following criteria.

The fixing strength of 2.0 MPa or more was ranked as a grade of "A", the fixing strength of 0.5 MPa or more and less than 2.0 MPa was ranked as a grade of "B", and the fixing strength of less than 0.5 MPa was ranked as a grade of "C". In this test, the evaluation was carried out such that a grade of "B" or higher is an acceptable level, while grade "A" is an especially excellent level.

(3) Electrical Characteristics (Partial Discharge Inception Voltage (PDIV)) Test For the measurement of the partial discharge inception voltage of each of the insulated wires thus produced, use was made of a partial discharge testing machine (manufactured by Kikusui Electronics Corp., trade name: KPD 2050).

For each of the insulated wires, a test specimen was produced by adhering the flat surfaces of two insulated wires over a length of 150 mm without any voids therebetween. An electrode was connected between the two conductors of this test specimen, and the voltage was continuously increased while an alternating current voltage at 50 Hz was applied thereto at a temperature of 25° C. The voltage at the time point where a partial discharge of 10 pC occurred was read out as the peak voltage (Vp). Here, the term "flat surface" refers to a surface in which the longer side (side along the horizontal direction in FIGS. 1 and 2) is continuously formed in the axial direction, in the cross-sectional shape of a rectangular-shaped insulated wire. Therefore, the test specimen was in a state in which, for example, another insulated wire 1 was superposed on or underneath the insulated wire 1 illustrated in FIG. 1.

The case where the peak voltage was 1,000 (Vp) or higher, is rated to as "A"; the case where the peak voltage was 700 (Vp) or higher and lower than 1,000 (Vp), is rated to as "B"; and the case where the peak voltage was lower than 700 (Vp), is rated to as "C". In this test, the evaluation was carried out such that a grade of "B" or higher is an acceptable level, while grade "A" is an especially excellent level.

(4) Bending Workability Test (Adhesiveness Test)

The adhesiveness between the conductor and the resin layer in any of the insulated wires was evaluated by the following bending workability test.

A linear test specimen having a length of 300 mm was cut out from each of the insulated wires thus produced. A scratch (incision) having a depth of about 5 μm and a length of 2 μm was inserted into the central region of the resin layer (A) on an edge surface of this linear test specimen respectively in two directions, namely, the longitudinal direction and the perpendicular direction using a tool for exclusive use (at this time, the resin layer (A) and conductor were adhered and were not detached). Here, the term of edge surface means a surface in which the shorter side (the thickness, the side along the vertical direction in FIGS. 1 and 2) in the cross-sectional shape of the rectangular-shaped insulated wire is formed continuously in the axial direction. Therefore, the scratch is provided in either one lateral surface of the left-hand side surface and the right-hand side surface of the insulated wire 1 illustrated in FIG. 1.

This scratch was used as the vertex, and the linear test specimen was bent 180° (U-shape) around an axis of an iron core having a diameter of 1.0 mm. The resultant state was maintained for 5 minutes. The progress of detachment between the conductor and resin layer (A) occurring around the vertex of the linear test specimen was observed with the naked eye.

In this test, the case where none of the scratches formed in the resin layer (A) was expanded, and the resin layer (A) was not detached from the conductor, was designated as acceptable: "A". The case where at least one of the scratches formed in the resin layer (A) was expanded, and the entirety of the resin layer (A) was detached from the conductor or the like, was designated as unacceptable: "C".

The above results are collectively shown in the following Table 1. The details of the resins described in the Tables are as follows:

PAI: polyamideimide (trade name: HI 406, manufactured by Hitachi Chemical Co., Ltd., the resin was varnished, and then the varnish was coated and baked to form a layer)

PI: polyimide (trade name: U IMIDE AR, manufactured by Unitika Ltd., the resin was varnished, and then the varnish was coated and baked to form a layer)

PEEK: polyetheretherketone (trade name: KITA SPIRE KT-820, manufactured by Solvay Specialty Polymers, the resultant layer was formed by extrusion-covering, after melting the resin)

PC: polycarbonate (trade name: CALIBRE 300, manufactured by Sumika Styron Polycarbonate Limited, the resultant layer was formed by extrusion-covering, after melting the resin)

PSU: polysulfone (trade name: Udel P3703, manufactured by Solvay Specialty Polymers, the resultant layer was formed by extrusion-covering, after melting the resin)

PPSU: polyphenylsulfone (trade name: Radel R5800, manufactured by Solvay Specialty Polymers, the resultant layer was formed by extrusion-covering, after melting the resin)

PES: polyethersulfone (trade name: SUMIKAEXCEL 4800G, manufactured by Sumitomo Chemical Company, the resultant layer was formed by extrusion-covering, after melting the resin)

PEI: polyetherimide (trade name: ULTEM 1000, manufactured by SABIC, the resultant layer was formed by extrusion-covering, after melting the resin)

Epoxy resin: bisphenol A-type epoxy resin (trade name: 1004, manufactured by Mitsubishi Chemical Corporation, the varnish was obtained by utilizing methyl ethyl ketone (MEK) when using)

PET: polyethylene terephthalate (trade name: TR8550, manufactured by TEIJIN Ltd., the resultant layer was formed by extrusion-covering, after melting the resin)

TABLE 1

|  |  | Ex 1 | Ex 2 | Ex 3 | Ex 4 | Ex 5 |
|---|---|---|---|---|---|---|
| Insulating layer (A) | Resin | PAI | PAI | PAI | PAI | PAI |
|  | Thickness (μm) | 40 | 40 | 30 | 40 | 40 |
| Insulating layer (B) | Resin | PEEK | PEEK | PEEK | PPS | PEEK |
|  | Thickness (μm) | 160 | 160 | 200 | 120 | 60 |
| Adhesion layer (C) | Resin | PEI | PEI | PEI | PEI | PSU |
|  | Substance having amino groups | 4,4'-diaminodiphenyl ether | 1,6-hexane diamine | 1,6-hexane diamine | 1,4-butane diamine | 1,4-butane diamine |
|  | Mass ratio (mass %) | 8 | 10 | 6 | 4 | 8 |
|  | Elastic modulus (×10$^7$ Pa) | 2.5 | 2.5 | 2.5 | 2.5 | 1.2 |
|  | Melting point (° C.) | None | None | None | None | None |
|  | Thickness (μm) | 50 | 30 | 100 | 150 | 200 |
| Film layer (D) | Resin | PC | — | PC | PSU | PEI |
|  | Elastic modulus (×10$^7$ Pa) | 0.8 | — | 0.8 | 1.2 | 2.5 |
|  | Melting point (° C.) | None | — | None | None | None |
|  | Thickness (μm) | 150 | — | 80 | 200 | 120 |
| Fixing strength in high temperature |  | A | A | A | A | A |
| Partial discharge inception voltage |  | A | A | A | A | A |
| Bending workability |  | A | A | A | A | A |

|  |  | Ex 6 | Ex 7 | Ex 8 | Ex 9 | Ex 10 |
|---|---|---|---|---|---|---|
| Insulating layer (A) | Resin | PAI | PAI | PI | PAI | PAI |
|  | Thickness (μm) | 60 | 100 | 40 | 60 | 40 |
| Insulating layer (B) | Resin | — | — | — | — | PPS |
|  | Thickness (μm) | — | — | — | — | 100 |
| Adhesion layer (C) | Resin | PC | PSU | PEI | PES | PPSU |
|  | Substance having amino groups | 1,4-butane diamine | 1,10-decane diamine | 4,4'-diaminodiphenyl ether | 4,4'-diaminodiphenyl ether | 1,4-butane diamine |
|  | Mass ratio (mass %) | 6 | 8 | 5 | 6 | 4 |
|  | Elastic modulus (×10$^7$ Pa) | 0.8 | 1.2 | 2.5 | 9.7 | 3.9 |
|  | Melting point (° C.) | None | None | None | None | None |
|  | Thickness (μm) | 5 | 15 | 50 | 15 | 20 |
| Film layer (D) | Resin | PEI | PC | PSU | PEI | — |
|  | Elastic modulus (×10$^7$ Pa) | 2.5 | 0.8 | 1.2 | 2.5 | — |
|  | Melting point (° C.) | None | None | None | None | — |
|  | Thickness (μm) | 120 | 100 | 150 | 50 | — |
| Fixing strength in high temperature |  | A | A | A | A | A |
| Partial discharge inception voltage |  | B | A | A | B | A |
| Bending workability |  | A | A | A | A | A |

|  |  | CEx 1 | CEx 2 | CEx 3 | CEx 4 | CEx 5 |
|---|---|---|---|---|---|---|
| Insulating layer (A) | Resin | PAI | PAI | PAI | PAI | PAI |
|  | Thickness (μm) | 40 | 40 | 40 | 40 | 40 |
| Insulating layer (B) | Resin | — | — | PEEK | PEEK | PEEK |
|  | Thickness (μm) | — | — | 50 | 160 | 160 |
| Adhesion layer (C) | Resin | — | — | — | Epoxy | PET |
|  | Substance having amino groups | — | — | — | 1,6-hexanediamine | 1,4-butanediamine |
|  | Mass ratio (mass %) | — | — | — | 6 | 8 |
|  | Elastic modulus (×10$^7$ Pa) | — | — | — | 0.2 | 10.3 |
|  | Melting point (° C.) | — | — | — | None | None |
|  | Thickness (μm) | — | — | — | 30 | 30 |
| Film layer (D) | Resin | — | PEI | PEI | PC | PC |
|  | Elastic modulus (×10$^7$ Pa) | — | 2.5 | 2.5 | 0.8 | 0.8 |
|  | Melting point (° C.) | — | None | None | None | None |
|  | Thickness (μm) | — | 120 | 120 | 100 | 100 |

TABLE 1-continued

| | | | | | |
|---|---|---|---|---|---|
| Fixing strength in high temperature | C | C | C | C | A |
| Partial discharge inception voltage | B | B | B | A | A |
| Bending workability | — | C | C | A | C |

Remarks: 'Ex' means Example according to this invention.
Remarks: 'CEx' means Comparative Example.
<Notes for the Tables above>
Insulating layer (A): The insulating layer formed on the outer periphery of the conductor
Insulating layer (B): The insulating layer formed on the outer periphery of the insulating layer (A)
Adhesion layer (C): The adhesion layer formed on the outer periphery of the insulating layer (A) or the insulating layer (B)
Thickness: Unit is in terms of μm
Mass ratio: The mass fraction of the substance having amino groups with respect to the adhesion layer
Elastic modulus: Tensile modulus at 250° C.

It is apparently seen from Table 1 that the insulated wires of Examples 1 to 10 each of which satisfies the requirements for the present invention are fixed to other parts with a strong fixing strength at 200° C., and have a high partial discharge inception voltage (PDIV) of the bending section and an excellent bending workability and heat resistance without an additional insulating layer. Further, it is seen that because these insulated wires have excellent bending workability, when the insulated wires are inserted into a slot of the stator core, displacement of the film layer does not occur.

Further, because the insulated wires of Examples 1 to 10 are produced by extrusion molding, a varnish is not used and therefore a solvent is not used. For this reason, this provides a safe and environmentally-friendly manufacturing process.

Because the insulated wire of Comparative Example 1 has neither adhesion layer nor film layer, this insulated wire was unacceptable in terms of fixing strength at 200° C. Meanwhile, because this insulated wire has no film layer, a bending workability test was not conducted. Because the insulated wires of Comparative Examples 2 and 3 have no adhesion layer, these insulated wires were unacceptable in terms of fixing strength at 200° C. and bending workability. The insulated wire of Comparative Example 4 was unacceptable in terms of fixing strength at 200° C., because the tensile modulus at 250° C. of the resin that constitutes the adhesion layer was out of range specified in the present invention. The insulated wire of Comparative Example 5 was unacceptable in terms of bending workability, because the resin that constitutes the adhesion layer has a melting point.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST 1, 2 Insulated wire
11, 21 Conductor
12, 22, 22A, 22B Insulating layer
13, 23 Adhesion layer
14, 24 Resin covering layer
15, 25 Film layer
40 Coil
41 Core
42 Groove
50 Stator
51 Stator core
52 Slot
53 Coil
54 Wire segment
54a Open end

The invention claimed is:

1. An insulated wire, comprising:
a single conductor or multiple conductors;
an insulating layer on the outer periphery of the single conductor or each of the multiple conductors; and
an adhesion layer on the outer periphery of the insulating layer,
wherein the thickness of the adhesion layer is 2 to 200 μm,
wherein a resin constituting the adhesion layer does not have a melting point,
wherein the resin constituting the adhesion layer has a tensile modulus of $0.6 \times 10^7$ to $10 \times 10^7$ Pa at 250° C., and
wherein a substance having 2 or more amino groups exists on the surface of the adhesion layer.

2. The insulated wire according to claim 1, wherein the cross-sectional shape of the conductor is rectangular.

3. The insulated wire according to claim 1, which has a film layer on the outer periphery of the adhesion layer,
wherein a resin constituting the film layer does not have a melting point, and
wherein the resin constituting the film layer has a tensile modulus of $0.6 \times 10^7$ to $10 \times 10^7$ Pa at 250° C.

4. The insulated wire according to claim 3, wherein the insulating layer is coated on the periphery of the single conductor, the adhesion layer is coated on the insulating layer, and the film layer is coated on the periphery of the adhesion layer.

5. The insulated wire according to claim 3, which is stacked on top of each other to form multiple layers, and has the film layer on the outer periphery of the stacked insulated wire.

6. The insulated wire according to claim 3, wherein the thickness of the film layer is 10 to 200 μm.

7. The insulated wire according to claim 3, wherein the film layer contains at least one kind of resins selected from the group consisting of polyetherimide, polycarbonate and polysulfone.

8. The insulated wire according to claim 1, wherein the thickness of the insulating layer is 30 to 200 μm.

9. The insulated wire according to claim 1, wherein the total thickness of the adhesion layer and insulating layer is 65 to 330 μm.

10. The insulated wire according to claim 1, wherein the adhesion layer contains at least one kind of resins selected from the group consisting of polyetherimide, polycarbonate, polysulfone, polyphenylsulfone and polyethersulfone.

11. The insulated wire according to claim 1, wherein the adhesion layer is porous.

12. The insulated wire according to claim 1, wherein a crystal melting peak or a crystallization peak of the resin constituting the adhesion layer is not observed in a differential scanning calorimetric analysis.

13. A coil, comprising the insulated wire according to claim 1.

14. An electrical or electronic equipment, comprising the coil according to claim 13.

15. A superconducting coil, comprising the insulated wire according to claim 1.

* * * * *